UNITED STATES PATENT OFFICE.

ALBRECHT PAGENSTECHER, OF JERSEY CITY, NEW JERSEY, ASSIGNOR TO GUSTAVE FRANK, OF NEW YORK, N. Y.

ARTIFICIAL FUEL.

SPECIFICATION forming part of Letters Patent No. 435,076, dated August 26, 1890.

Application filed March 1, 1889. Serial No. 301,687. (No specimens.)

*To all whom it may concern:*

Be it known that I, ALBRECHT PAGENSTECHER, a citizen of the United States of America, and a resident of Jersey City, in the county of Hudson and State of New Jersey, have invented certain new and useful Improvements in Composite Fuel, of which the following is a full, clear, and exact specification.

My invention relates to a new and improved fuel composition which I term "Sestalit," and which is compressed into lumps, blocks, or cakes and used as a substitute for coal or other heating agents for domestic or other purposes, the composition having the quality and properties of burning slowly and continuously without flame, smoke, or noxious gases or vapors and emitting an intense and uniform heat.

The invention consists of a fuel composition which is composed of any suitable carbonaceous substance, preferably pulverized charcoal, anthracite, or coke and starch, saltpeter, and brown sandstone.

The method of compounding the ingredients is as follows: One hundred pounds of pulverized charcoal or coke are mixed with three pounds and a half of saltpeter, three pounds of starch, which is made in a thin paste by additional water, and one-half of a pound of powdered brown sandstone. These ingredients are mixed with water in a sufficient quantity to produce a plastic composition, the starch imparting a proper degree of adhesion to the mass when the same has been compressed into molds, while the saltpeter supplies the necessary oxygen for making it burn with little draft. Brown sandstone serves to absorb and neutralize any slight smell that starch may possibly produce, and also to some extent for retarding the too-quick burning of the fuel composition, the same being added in a somewhat larger quantity when used with anthracite coal or coke, while a smaller quantity is required when charcoal is used. The mass, after being thoroughly mixed, is run or pressed into molds and compressed into blocks, lumps, or cakes of the desired size and shape. The lumps or cakes are then dried with a gentle heat until all moisture is entirely evaporated therefrom. The lumps, blocks, or cakes burn with a very slight draft, and without smoke, noxious gases, or flame, and emit a very slow volume of heat. The fuel can be ignited by means of a match, and then continues to burn slowly, so that it is adapted to be used in sad-irons, plumbers' furnaces, foot-warmers, heating and cooking stoves, car-heaters, and for other purposes.

Having thus described my invention, I claim as new and desire to secure by Letters Patent—

The herein-described fuel composition, consisting of pulverized charcoal, anthracite or coke, and starch, saltpeter, and brown sandstone, substantially in the proportions specified, and in the manner described.

In testimony that I claim the foregoing I have hereunto set my hand this 27th day of February, 1889.

ALBRECHT PAGENSTECHER.

Witnesses:
RYNIER J. WORTENDYKE,
JAMES H. LANCASTER.